United States Patent [19]

Cottis et al.

[11] 3,974,250

[45] Aug. 10, 1976

[54] METHOD FOR REDUCING CRYSTALLINE ORIENTATION OF PARA-OXYBENZOYL POLYESTERS

[75] Inventors: Steve G. Cottis, Amherst; James Economy, Eggertsville; Roger S. Storm, Williamsville; Luis C. Wohrer, Lewiston, all of N.Y.

[73] Assignee: The Carborundum Company, Niagara Falls, N.Y.

[22] Filed: Sept. 4, 1973

[21] Appl. No.: 394,023

[52] U.S. Cl. ............................. 264/68; 260/47 C; 264/80; 264/126; 264/322; 264/331
[51] Int. Cl.² ................................................ B29B 3/00
[58] Field of Search............... 260/47 C; 264/80, 85, 264/68, 235–237, 345–348, 234, 92, 322, 25, 126, 331, 309

[56] References Cited
UNITED STATES PATENTS

| | | | |
|---|---|---|---|
| 3,644,593 | 2/1972 | Nowak et al. | 260/47 C |
| 3,662,052 | 5/1972 | Nowak et al. | 264/119 |
| 3,725,519 | 4/1973 | Seifried et al. | 264/237 |
| 3,759,870 | 9/1973 | Economy et al. | 260/47 C |
| 3,790,528 | 2/1974 | Tesaki et al. | 260/47 C |
| 3,829,406 | 8/1974 | Cottis et al. | 260/47 C |

*Primary Examiner*—Robert F. White
*Assistant Examiner*—James B. Lowe
*Attorney, Agent, or Firm*—David E. Dougherty; Raymond W. Green

[57] ABSTRACT

Polyesters of para-oxybenzoyl are infusible and very resistant to acids and solvents, thus limiting the means by which such polymers can be fabricated. Such a polyester is made more amorphous, thus improving compression moldability, by subjecting it to a high temperature treatment, followed by a rapid quench. The resulting polymer has reduced crystalline orientation, as evidenced by X-ray diffraction patterns, and molded articles thereof have improved flexural strength, without adversely affecting the modulus. The thermal treatment is carried out on the polymer by heating at a temperature of at least 300°C, and up to just below the decomposition temperature of the polymer, followed by quenching of the hot polymer.

13 Claims, No Drawings

METHOD FOR REDUCING CRYSTALLINE ORIENTATION OF PARAOXYBENZOYL POLYESTERS

The present invention relates to infusible, insoluble and usually crystalline polymers of wholly aromatic polyesters, and more particularly to high polymers of para-oxybenzoate. More specifically, the invention is directed to a method for improving the moldability of such highly crystalline polymers so that they can be more readily formed into useful articles.

In recent years, considerable interest has been generated in a certain class of wholly aromatic polyesters because of their highly desired properties of insolubility and high temperature infusibility. Of particular interest are polymers having recurring para-oxybenzoyl structural units. Such polymers are highly crystalline and decompose at a temperature in excess of 510°C. The polymers reach decomposition temperatures without undergoing a melt phase.

In addition to the highly desirable thermal properties of these polymers, they are insoluble in known solvents and are very resistant to acids. These properties, while often being highly desirable attributes of the polymer, sometimes greatly limit the ability to fabricate them into useful structures. It has been found that such polymers can, however, be fabricated by certain compression molding techniques, preferably at elevated temperatures. Under high pressures, sufficient polymer flow is achieved to bind particulate polymer into a solid structure. It has now been discovered that by effecting a certain pre-treatment of the polymer, compression moldability is greatly enhanced so that shaped articles of higher flexural strength are achieved without lowering the modulus. Additionally, stress-crazing or cracking is greatly reduced or eliminated in the resulting product.

It is therefore an object of the present invention to provide a polypara-oxybenzoyl polymer of reduced crystallinity compared to that previously obtained.

It is another object of the present invention to provide an improved high temperature polypara-oxybenzoate having a more amorphous crystalline structure, as evidenced by X-ray diffraction patterns, a substantially different crystal transition temperature and an improved coefficient of expansion.

These and other objects of the invention will become more apparent from the description of the invention which follows.

In accordance with the invention, there is provided a method for improving the moldability of polypara-oxybenzoate polymers comprising subjecting a polymer of para-oxybenzoate to a heat treatment at a temperature of at least 300°C, up to the decomposition temperature of the polymer, said polymer having a degree of polymerization sufficient to withstand melting at the heat treatment temperature, said heat treatment being followed by a rapid and immediate reduction of the polymer temperature, thereby reducing the crystallinity of said polypara-oxybenzoate. The noted heat treatment produces a novel polypara-oxybenzoate having a melting point in excess of its decomposition temperature, of reduced crystallinity as evidence by X-ray diffraction patterns, a marked decrease in the intensity of endothermic properties upon heating through the temperature region of 320° to 360°C, and a marked decrease in the exothermic properties upon cooling through the temperature range of 320° to 290°C, wherein said exothermic properties are shifted about 10°C lower, as measured with a differential thermal analyzer, said measurements being compared to para-oxybenzoate polymer which has not been subjected to said thermal treatment and quench.

The resulting polymer is more readily compression molded, and yields a dense product having high flexural strength and about the same modulus. Crazing and pinhole formation are largely eliminated from such shaped articles due to the improved flow properties of the modified polymer.

The polymer of the present invention is a para-oxybenzoyl polymer having a decomposition temperature in excess of 510°C, which polymer is infusible at temperatures below the decomposition temperature. Such polyesters are preferably para-oxybenzoyl homopolyesters, because such homopolyesters do not have melting points and have very high decomposition temperatures. They are also extremely crystalline. The polymers of the present invention may be produced by the homopolymerization of hydroxybenzoic acid or a source of derivative thereof. Alternatively, an ester interchange reaction can be utilized wherein the reacting monomer is p-acetoxybenzoic acid and a chain terminator is phenyl p-acetoxybenzoate. The condensation reaction may be carried out in the presence of a solvent or in the molten state, but it is advantageously carried out in a non-reactive high boiling solvent. The utilization of an inert solvent tends to make the polymerization more easily controllable.

The rate of condensation and polymerization is largely controlled by time and temperature, with increasing temperatures expediting the reaction. Little or no polymerization occurs at room temperature, with good reaction rates being attainable in the temperature range of 170° to 360°C.

In forming the para-oxybenzoyl homopolyester, it is most convenient to utilize hydroxybenzoic acid and acetic anhydride as the ester interchange agent or, as noted above, the corresponding acetoxybenzoic acid and the phenyl ester. Accordingly, the reaction is preferably effected in the presence of an inert solvent compatible with the distillation of acetic acid. It will usually be advantageous to employ the highest practicable temperature. The maximum temperature which is used will be governed in part by the boiling point or decomposition point of the particular monomer reactants and solvent material. The temperature limitation imposed by the particular monomers involved can be largely controlled by utilizing initially lower temperatures and stepwise increasing the temperature as the condensation reaction progresses.

When a solvent or dispersion aid is employed, the maximum temperature at which the condensation reaction is carried out is limited by its boiling point. Therefore, in most instances, it is most desirable that a high boiling solvent be utilized so as not to be lost due to evaporation at the temperature and under the conditions desirably utilized to carry out the condensation reaction. Experience has indicated that solvents having comparatively high boiling points, such as those boiling at 250° or 300°C or more are usually preferred, as such boiling points permit the condensation to be carried out under atmospheric pressure and at temperatures which effect a good rate of reaction. Of course, if desired, superatmospheric or subatmospheric pressures can be used so as to extend the class of useful solvents.

Numerous inert solvents have been found to be suitable. A class of solvents which has been found to be particularly suitable with respect to inertness and boiling points includes the terphenyls, such as partially hydrogenated terphenyls commercially available under the trademark Therminol 66; a eutectic mixture of diphenyl oxide and diphenyl, which is commercially available under the trademark of Dowtherm A; and mixtures of various polychlorinated polyphenyls such as chlorinated bisphenyls, which are commercially available under the trademarks Therminol FR and Aroclor. Additionally, polyphenyl ethers and polyaromatic ethers and mixtures thereof, such as commercially available under the trademark Therminol 77, having boiling points in ranges in excess of 400°C have been found to meet the requirements of the present reaction.

The reaction proceeds without a catalyst. However, it is sometimes preferable to carry out the reaction in the presence of a catalytic amount of a suitable condensation catalyst. Certain of these catalysts will increase the rate of condensation and the degree of polymerization for a given period of time at a given temperature. Such catalysts are known in the art as transesterification catalysts and include, for example, sodium alkoxides, titanium alkoxides and esters, e.g., tetrabutylorthotitanate, sodium titanium alkoxides, lithium hydroxide, magnesium hydroxide and para-toluene sulfonic acid and numerous other transesterification catalysts well known in the aromatic polyester art, such as those utilized in the transesterification effected for the formation of polyethylene terephthalate.

The polymerizationn is carried out to achieve a degree of polymerization wherein the polymer does not melt at a temperature of at least 300°C and more preferably, does not melt at a temperature in the range of 300° to 500°C, and more preferably yet, such polymer is infusible. The most desirable polymers decompose at temperatures in excess of 500°C, without reaching a melting point. Such polyesters have average molecular weights of at least 10,000 and more preferably, molecular weights of 25,000 or more and are characterized by extreme thermal stability. The precise properties of these various polyesters will depend upon such factors as molecular weight and polymer terminal groups. In essence, however, the polymers produced according to the present invention are highly crystalline, infusible and insoluble in known solvents.

In a polymerization process using the preferred method, employing a nonreactive solvent, the polymer normally precipitates from the solvent mixture in particle form. This polymer is separated from the nonreactive solvent which, while being a solvent for the monomers, is not a solvent for the polymer. The polymer is washed with a readily vaporizable solvent, e.g., acetone, to extract the residual polymerization solvent. The resulting polymer is in a particle form and can be utilized as such. If desired, further solid state polymerization can be effected upon this polymer. Such polymerization involves the heating of the polymer at elevated temperatures in the range of 250° to 450°C, preferably under reduced pressure, which also helps to remove all traces of water, acetic acid and phenol.

The resulting high polymer is treated in accordance with the present invention by heating it so that is passes through its crystal-crystal transition temperature. Such temperature is readily detected by differential thermal analysis and is generally in excess of 300°C. For the most preferred homopolyesters, the temperature is in the range of 320° to 360°C. This particular heating step can be part of the terminal phase of a solid state polymerization reaction, if so desired.

Having heated the polymer to the elevated temperature, it is rapidly quenched so as to effect a sharp and drastic reduction in temperature of the polymer to below about 200°C. While the exact mechanism involved is not fully understood, it is believed that the heat treatment through the crystal-crystal transition temperature brings about crystal reorientation to a more amorphous state, and that such reorientation can be frozen into the polymer by a rapid drop in temperature. The decrease should take place within 0.1 to 100 seconds, preferably 0.1 to 10 seconds, for best results. The effect of this process on the polymer is readily measured by differential thermal analysis and is ascertainable by comparisons of X-ray diffraction patterns.

The most suitable treatment temperature is largely determined by the particular polymer involved. For the most preferred homopolymer of para-oxybenzoyl, a sharp crystal-crystal transition occurs in the temperature range of 320° to 360°C. This transition is associated with an absorption of heat in an amount of about one-half kilocalorie per mole of polymer repeat units. This transition can be measured by the pronounced endothermic reaction in this temperature range. Upon cooling the homopolyester, an exothermic change occurs in a differential thermal analyzer in the temperature range of 300° to 330°C. Coupled with the endothermic and exothermic reactions, there is a substantial thermal expansion change which occurs in the temperature range of 330° to 360°C. The para-oxybenzoyl homopolyester exhibits about an eight-fold increase in its thermal expansion coefficient in this temperature range over that which occurs at lower temperatures, thus further indicating crystal reorientation. The treatment of the present invention drastically changes this thermal expansion coefficient.

The heating of the polymer can be effected on solid, chip, thin film, shaped articles, finely divided particles and the like. However, as a practical matter, the polymer is more conveniently treated as a thin film, in particle form or as a finely divided powder so that rapid changes in polymer temperature can be more readily effected.

Such particle sizes can range from a U.S. Standard Sieve Series sieve of from five-sixteenths inch up to about No. 200. Particles passing through such sieves range in size from about 0.07 to about 8 mm. The most preferred particle size is in the range from that which is retainable on Sieve No. 100 and passes through Sieve No. 3.5. This particle range is from about 0.15 to about 5.7 mm. Films which may be used are of equivalent thicknesses. Larger particle sizes or granules can also be used. However, the time required to effect the temperature change and the ability to effect a rapid quench or lowering of the temperature are dependent to an extent on the sizes of the particles utilized. Thus, with larger particle sizes, the quench means utilized should be sufficient to effect a quick drop in the polymer temperature through the crystal-crystal transition point. Cold water baths are found to be most effective in this respect but other means to promote changing the highly crystalline polymer form to the more amorphous state are also operative.

The heat treating step can be effected in either air or an inert atmosphere. The high resistance of the polymer to degradation in the crystal-crystal transition temperature range permits the heat treatment to be conducted in the presence of oxygen, if so desired. Additionally, such treatment can be effected in a stream of gases inert to the polymer under the temperatures of the treatment. For instance, ionized helium gas in a plasma stream can be utilized to effect the heat treatment for a short time at a high temperature. Alternatively, a combustible mixture of gases such as oxygen and propane, hydrogen and nitrogen, air and hydrogen, and other known combustible mixtures can be used, all of which are inert to the polymer under the conditions of temperature and dwell time utilized. Dwell times for plasma heating are usually very short, e.g., 0.001 to 1 second.

The polymer can be heated in finely divided or particulate form in a plasma and the plasma-sprayed polymer can be directed into a water bath or other suitable medium to effect rapid quenching or cooling. In the same manner, particulate polymer can be carried by a heated gas stream into a quench area such as an inert liquid, a solid heat sink, or an inert cold gas stream. Such a cooling medium has sufficient specific heat constant, volume and reduced temperature so as to reduce the temperature of the polymer to below about 290°C and more preferably, below about 200°C. Heat sinks, particularly highly heat conductive surfaces such as highly heat conductive metal plates or water-cooled condensers can be used to rapidly drop the polymer temperature on contact therewith. Refrigeration means, low temperature solvent baths, etc., are also useful.

Another method of effecting the heat treatment of the present invention is by means of high shear. Grinding, drilling, abrading and other workings of the polymer, especially at the surface thereof, can be utilized to create frictional heat within the desired temperature range. Polymer so heated can be quenched or cooled by suitable means, as by directing a jet of inert gas, cooling water, or the like against the polymer surfaces.

It has been observed that the high molecular weight homopolyesters of this invention, usually of molecular weights of 10,000 or 25,000 to 50,000, 500,000 or even to a million in some cases, when treated by the invented method, have significantly different X-ray diffraction patterns from comparable polyesters not so treated. Additionally, differential thermal analysis indicates that the cooling exotherm has been shifted to about 10° lower than in polymer which has not been treated in accordance with the present invention. The exact temperatures of the endothermic reactions and exothermic reactions of the polymers are readily determined by differential thermal analysis. For each given polymer, the heat treatment, to be most effective, includes the heating of the polymer to or through its endothermic reaction temperature region, followed by cooling, quenching or other suitable technique to retain it in the more amorphous state of the endothermic region.

Although the preferred methods of heating and cooling have been described, it will be recognized that other methods such as the use of infra-red heating means, induction heating and the like can be used with corresponding good results. Additionally, while the heating of the polymer can be for a relatively short time, particularly when the polymer is in a finely divided state, longer periods of heating can also be utilized. For instance, the time can range from a fraction of a second such as in plasma heating of particulate polymer to several hours, as is most desirable for larger batches of polymer and/or with larger polymer particle size. Thus, the heating time in the crystal-crystal transition temperature range is from about 0.001 second up to about 8 hours and, more preferably, from about 0.1 second to about 5 minutes. In some instances the polymer may be heated to the endothermic, more amorphous stage and may be molded in such state without quenching or cooling, so long as it is sufficiently amorphous when first molded.

Molding conditions used may be those known for the present polyesters, some of which are described in French Pat. No. 1,568,152 and U.S. Pat. No. 3,662,052. Pressures will usually be from 1,000 to 100,000 lbs/sq in, preferably 2,000 to 20,000 lbs/sq in, and molding times may be from 0.1 second to 1 hour, preferably 1 minute to 10 minutes. Molding temperatures are from 300° to 500°C.

The invention will be more readily understood from reference to the following examples, which are illustrative of certain preferred embodiments thereof. Unless otherwise indicated, all temperatures are in °C and all parts and percentages are by weight.

EXAMPLE 1

A mixture of 856 parts of phenyl para-hydroxybenzoate, 0.015 part of tetra-n-butyl orthotitanate and 1800 parts of Therminol 66, a polychlorinated polyphenyl solvent (b.p. 360°–370°C) is heated, with constant stirring and under an atmosphere of flowing nitrogen, at 170°–190°C for 4 hours and then at 340°–360°C for 10 hours. Early in this heating cycle the mixture becomes a homogenous liquid. During the heating cycle condensation occurs, accompanied by the distillation of phenol, and the polyester which is produced thereby forms a precipitate. The mixture is cooled to room temperature and extracted with acetone to remove the polychlorinated polyphenyl solvent and the product is dried overnight in vacuum at 60°C. A yield of 377 parts of polyester powder is obtained, consisting essentially of a para-oxybenzoyl polyester of a molecular weight in the 25,000 to 100,000 range.

The homopolyester exhibits a sharp endothermic transformation when heated through the temperature range of 320° to 360°C, absorbing heat in the amount of about one-half kilocalorie per mole of polymer repeating unit, as measured in a differential thermal analyzer. Upon slow cooling, over a period of several hours, an exothermic reaction occurs in the temperature range of 300° to 330°C. X-ray diffraction patterns of the noted homopolymer using monochromatic copper K alpha radiation show that the polymer is highly crystalline.

EXAMPLE 2

The para-oxybenzoyl homopolyester produced in Example 1 is treated in accordance with the present invention by feeding powdered polymer through a plasma flame spray system at a rate of 3 pounds per hour, using a nitrogen-hydrogen gas mixture at a pressure of 50 lbs/sq in, whereby the temperature is raised to over 360°C for less than a second. The gas flow rates are 150 cubic feet per hour of nitrogen and 10 cubic feet per hours of hydrogen. The plasma spray of polymer is directed against a water bath quench at 25°C so as to rapidly cool the treated polymer in the water, cooling being effected to below 200°C almost instantaneously, e.g., within 0.1 to 1 second. The polymer is collected and dried. The X-ray diffraction pattern indicates that a transition to a more amorphous material has occurred.

Shaped samples of the polymer are compression molded at 368°C for 5 minutes at 5,000 lbs/sq in pressure and are cooled over a 20 minute period to 20°C, to 200°C after about 5 minutes. The resulting specimen is free of cracks, voids and crazing and is of an improved flexural strength of 11,140 lbs/sq inc and a modulus of $1.2 \times 10^6$ lbs/sq in. For comparison, untreated polymer of Example 1 is compression molded in the same manner under the same conditions. Such sample has a flexural strength of 7,600 lbs/sq in and a modulus of $1.2 \times 10^6$ lbs/sq in.

Differential thermal analysis of the treated polymer also indicates that the position of the endothermic reaction upon reheating of the polymer through the temperature range of 320° to 360°C is essentially the same, but the cooling exothermic reaction has shifted to approximately 10°C lower, and the intensities of the endotherm and exotherm are greatly reduced. The thermal coefficient of expansion in the crystal-crystal transition temperature range is reduced significantly compared to the untreated polymer of Example 1. This reduction may largely explain the elimination of visible crazing and cracking of the molded sample, because of a reduction of thermal stresses due to expansion and contraction.

EXAMPLE 3

Utilizing the homopolyester of Example 1 in powdered form (8 to 100 mesh), it is heated in an infra-red oven for two hours to a temperature of 350°C, after which it is cooled quickly, within 5 seconds, to 200°C, preferably by quenching in water. Round discs, 4 inches by one-half inch are compression molded at 368°C for 5 minutes at 10,000 lbs/sq in. pressure. An examination of the molded discs indicates that they are free of visible cracks. In the same manner, for comparison, identical discs are compression molded under the same conditions using a corresponding untreated homopolyester. All discs so produced show large visible cracks.

Similar results are obtained when 2 inch by ¼ inch discs are molded in the same manner from experimental and control materials, with the experimental product being heated for 1 hour to 360°C in a conventional oven and cooled in air to room temperature within 60 seconds, in either powder or equivalent thin film form. Further analyses indicate that chemical resistances, such as solvent resistance and acid resistance of both shaped treated and untreated polymers, are identical.

EXAMPLE 4

In the manner of Example 2, homopolyester of Example 1 is heat treated utilizing a plasma of ionized helium produced by passing the gas through a carbon arc. The plasma is maintained by induction heating, thereby generating very high gas velocities. Powdered homopolyester is fed into the plasma stream and the stream is directed at a water quench. Temperatures in the plasma are in excess of 1,500°C. However, the contact time of the powdered polyester in the plasma is so brief, e.g., 0.01 to 0.1 second, that no significant degradation of the polymer results.

Molded samples of the treated polymer exhibit the improved properties of those of Examples 2 and 3, including reduced crazing, cracks and voids, as well as improved moldability, increased strength and density.

EXAMPLE 5

The crystallinity of the polymer of Example 1 is changed in accordance with the present invention, utilizing shearing frictional forces to heat the polymer of a molded specimen. The shearing force is applied to a solid polymer specimen for 5 minutes, utilizing a rapidly rotating metal rod which shears the polymer into a previously described finely divided state and raises its temperature so that the crystal-crystal transition point is reached. The polymer is rapidly quenched, within 30 seconds, by a cooling air stream, thereby forming a polymer of reduced crystallinity comparable to that of Example 2, as evidenced by X-ray analysis and differential thermal analysis.

Instead of utilizing the particular preferred homopolyester of Example 1, various other such para-oxybenzoyl polyesters, made by other techniques such as are described in the previously mentioned patents and the present specification, are also utilized. Such products are within the molecular weight ranges previously given. Heating thereof may be by plasma or flame spraying or may be in infra-red or resistance ovens, on rotating heating drums, in trays or with other suitable heating apparatuses. Similarly, cooling or quenching can be effected by various suitable apparatuses and techniques, including baths, gas blasts, cooling coils and drums, trays, etc. Coolings may be under inert gas or air and sometimes may be omitted, as when the molding is conducted at a temperature at which the polymer is in the more amorphous or less crystalline state. Such described modifications can be effected with respect to the various polymers produced in accordance with this invention and by modifications of the procedures described in the working examples and the specification, in accordance with the present teachings.

Although the invention has been described herein with reference to certain examples and preferred embodiments, it is to be understood that various changes and modifications can be made by those skilled in the art without departing from the concept of the invention, the scope of which is determined by reference to the claims.

What is claimed is:

1. A method for improving the moldability of a para-oxybenzoyl polymer having a decomposition temperature in excess of 510°C, which polymer is infusible at temperatures below the decomposition temperature of the para-oxybenzoyl polymer; which polymer has a molecular weight in excess of 10,000, and a crystal-crystal transition temperature in excess of 300°C, but below the decomposition temperature of the polyester, comprising 1. subjecting a para-oxybenzoyl polymer having a decomposition temperature in excess of 510°C, which polymer is infusible at temperatures below the decomposition temperature of the para-oxybenzoyl polymer; which polymer has a molecular weight in excess of 10,000, and a crystal-crystal transition temperature in excess of 300°C, but below the decomposition temperature of the polyester, while the polymer is in a solid state, to a heat treatment at a temperature between the crystal-crystal transition temperature and the decomposition temperature of the polymer to reduce the crystallinity of the polymer, the polymer being heated being of a degree of polymerization sufficient to withstand melting at the heat treatment temperature;
2. cooling the polymer quickly, within a period of from 0.1 to 100 seconds, to below the crystal-crystal transition temperature of the polymer; and
3. molding or otherwise forming the polymer when in such state of reduced crystallinity.

2. A method according to claim 1 wherein the para-oxybenzoyl polymer is a homopolymer.

3. A method according to claim 2 wherein the heat treatment is to a temperature in the range of 300°C up to the decomposition temperature of the polymer and the cooling is to a temperature below about 200°C.

4. A method according to claim 3 wherein the heat treatment is to a temperature of 320° to 360°C and cooling is to from room temperature to 200°C.

5. A method according to claim 2 wherein heating is by plasma spraying and cooling is by quenching.

6. A method according to claim 2 wherein the homopolymer is heated in particulate form, of diameters in the 0.07 to about 8 mm range, and cooling is rapidly effected by quenching in water or by an air blast.

7. A method according to claim 2 wherein the heat treatment is effected by high speed shearing or grinding of the polymer.

8. A method according to claim 2 wherein heating is by plasma spraying and cooling is by quenching with an inert liquid, a solid heat sink or an inert gas stream within a period of from 0.1 to 10 seconds.

9. A method according to claim 2 wherein the heat treatment is effected by heating the polymer in thin film form to a temperature of at least 300°C. and the cooling is by quenching with a cooling airstream for a period from 0.1 to 100 seconds.

10. A method according to claim 2 wherein cooling is to a temperature below 200°C. and occurs within 0.1 to one second by quenching a plasma spray of polymer in a water bath.

11. A method according to claim 4 wherein heating is effected over a period of from 0.001 second to about eight hours and forming is by molding at 300° to 500°C for from 0.1 second to one hour at a pressure of from 1,000 to 100,000 lbs/sq inch.

12. A method according to claim 11 wherein heating is by plasma spraying and cooling is by quenching.

13. A method according to claim 11 wherein quenching is with an inert liquid, a solid heat sink or an inert cold gas stream within a period of from 0.1 to 10 seconds.

* * * * *